US012357532B2

(12) United States Patent
Bishop

(10) Patent No.: US 12,357,532 B2
(45) Date of Patent: Jul. 15, 2025

(54) SOOTHING VIBROTACTILE CUDDLE DEVICE

(71) Applicant: Gregory Scott Bishop, Irvine, CA (US)

(72) Inventor: Gregory Scott Bishop, Irvine, CA (US)

( * ) Notice: Subject to any disclaimer, the term of this patent is extended or adjusted under 35 U.S.C. 154(b) by 0 days.

(21) Appl. No.: 18/475,524

(22) Filed: Sep. 27, 2023

(65) Prior Publication Data

US 2024/0367196 A1 Nov. 7, 2024

Related U.S. Application Data

(60) Provisional application No. 63/499,694, filed on May 2, 2023.

(51) Int. Cl.

| | |
|---|---|
| ***B06B 1/02*** | (2006.01) |
| ***A61H 23/02*** | (2006.01) |
| ***A63H 3/36*** | (2006.01) |

(52) U.S. Cl.

CPC ......... *A61H 23/02* (2013.01); *A61H 23/0236* (2013.01); *A63H 3/36* (2013.01);

(Continued)

(58) Field of Classification Search

CPC .... A61H 23/00; A61H 23/0254; A61H 23/02; A61H 23/0236; B06B 2201/70;

(Continued)

(56) References Cited

U.S. PATENT DOCUMENTS 4,257,408 A * 3/1981 Ramey .................... A63H 3/001 601/46
5,007,410 A * 4/1991 DeLaney ........... A61H 23/0263 5/915

(Continued)

FOREIGN PATENT DOCUMENTS

DE 10 2018 004 685 A1 12/2019
EP 2 796 983 B1 11/2018

(Continued)

OTHER PUBLICATIONS

McDonald, Karen, "Cat Purring and Healing Bones," The Infinite Spider, Nov. 14, 2015, https://infinitespider.com/cat-purring-and-healing-bones/, 8 pages.

(Continued)

*Primary Examiner* — Tu A Vo
*Assistant Examiner* — Kelsey E Baller
(74) *Attorney, Agent, or Firm* — Master Key IP, LLP; Justin G. Sanders

(57) ABSTRACT

A vibrotactile plush device can include at least one transducer configured to generate a plurality of vibrations, at least one control unit configured to receive an input signal from a communication protocol and to transmit a first output signal to the at least one transducer, and a power source. The device can include a vibrotactile material configured to transmit the plurality of vibrations at one or more restorative or therapeutic frequencies to a body of a user. A padding material can be configured to dampen the plurality of vibrations. In some embodiments, the vibrotactile plush device can also be a weighted device and further comprise a heating pad. In some embodiments, the plurality of vibrations can simulate the purring of a cat, and a cover can be configured to possess a cat shape.

27 Claims, 4 Drawing Sheets

(52) U.S. Cl.
CPC ........ *B06B 1/0207* (2013.01); *A63H 2200/00* (2013.01); *B06B 2201/70* (2013.01)

(58) Field of Classification Search
CPC .... B06B 1/0207; A63H 3/36; A63H 2200/00; B60N 2/976; B60N 2/879; H04R 2400/00; B60R 11/0217; B60R 11/0223
See application file for complete search history.

(56) References Cited

U.S. PATENT DOCUMENTS

| | | | | | |
|---|---|---|---|---|---|
| 5,063,912 | A * | 11/1991 | Hughes | A61M 21/00 446/295 |
| 5,113,852 | A * | 5/1992 | Murtonen | A61H 23/0236 601/48 |
| 5,973,441 | A | 10/1999 | Lo et al. | |
| 6,175,981 | B1 * | 1/2001 | Lizama | A47D 9/057 5/915 |
| 6,968,806 | B2 * | 11/2005 | Helwig | A01K 1/0353 119/28.5 |
| 7,346,949 | B2 * | 3/2008 | Kamrin-Balfour | A47D 15/003 5/904 |
| 7,981,064 | B2 | 7/2011 | Oser et al. | |
| 8,139,803 | B2 | 3/2012 | Afshar | |
| 8,378,794 | B2 | 2/2013 | Alarcon | |
| 8,545,228 | B2 | 10/2013 | Dobson | |
| 8,926,330 | B2 | 1/2015 | Taghavi | |
| 9,417,694 | B2 | 8/2016 | Birnbaum et al. | |
| 9,461,529 | B2 | 10/2016 | Efrati | |
| 9,625,905 | B2 | 4/2017 | Rosenberg | |
| 9,672,703 | B2 | 6/2017 | Alexiou et al. | |
| 9,785,236 | B2 | 10/2017 | Afshar | |
| 9,880,621 | B2 | 1/2018 | Israr et al. | |
| 9,949,890 | B2 | 4/2018 | Choudhury et al. | |
| 10,051,354 | B2 | 8/2018 | Linjama et al. | |
| 10,111,010 | B2 | 10/2018 | Alexiou et al. | |
| D838,124 | S | 1/2019 | Jagtenberg | |
| 10,222,864 | B2 | 3/2019 | Knott et al. | |
| 10,293,249 | B2 | 5/2019 | Alghooneh et al. | |
| 10,314,292 | B2 | 6/2019 | Thorne | |
| 10,427,039 | B2 | 10/2019 | Heubel | |
| 10,445,996 | B2 | 10/2019 | Alghooneh et al. | |
| 10,470,971 | B2 | 11/2019 | Choudhury et al. | |
| 10,532,181 | B2 | 1/2020 | Hooper et al. | |
| 10,744,060 | B2 | 8/2020 | Choudhury et al. | |
| 10,812,914 | B2 | 10/2020 | Alexiou et al. | |
| 11,031,117 | B2 | 6/2021 | Mayo et al. | |
| 11,052,222 | B2 | 7/2021 | Engel et al. | |
| 11,185,659 | B2 | 11/2021 | Kalensky | |
| 11,213,761 | B2 * | 1/2022 | Lyell | A63H 3/001 |
| 11,285,614 | B2 | 3/2022 | Hayashi | |
| 11,289,988 | B2 | 3/2022 | Hayward et al. | |
| 11,334,163 | B1 | 5/2022 | Piazza et al. | |
| 11,433,316 | B1 | 9/2022 | MacKay | |
| D978,574 | S | 2/2023 | Bolier et al. | |
| 11,744,982 | B2 | 9/2023 | Kalensky | |
| 2005/0159685 | A1 * | 7/2005 | Klein | A61H 23/02 601/57 |
| 2005/0183722 | A1 * | 8/2005 | Bilgi | A61H 9/0078 128/203.12 |
| 2006/0258962 | A1 | 11/2006 | Kopanic et al. | |
| 2007/0100262 | A1 | 5/2007 | Simos et al. | |
| 2007/0253591 | A1 * | 11/2007 | Popilek | A61M 21/00 381/301 |
| 2009/0156089 | A1 * | 6/2009 | Hoard | A63H 13/02 446/297 |
| 2013/0005214 | A1 * | 1/2013 | Davies | H04R 1/028 446/397 |
| 2013/0228392 | A1 | 9/2013 | Iwata et al. | |
| 2014/0056461 | A1 | 2/2014 | Afshar | |
| 2015/0038887 | A1 * | 2/2015 | Piccirillo | A61H 23/02 601/112 |
| 2015/0040315 | A1 * | 2/2015 | Gersin | A61H 23/0263 5/417 |
| 2019/0134346 | A1 * | 5/2019 | Kirby | A61H 23/00 |
| 2019/0391647 | A1 | 12/2019 | Rihn et al. | |
| 2020/0113351 | A1 * | 4/2020 | McCoy | A47D 15/008 |
| 2020/0155076 | A1 | 5/2020 | Konishi et al. | |
| 2022/0152340 | A1 | 5/2022 | Goeij et al. | |
| 2022/0167930 | A1 | 6/2022 | Hannula et al. | |
| 2022/0265958 | A1 | 8/2022 | Bolier et al. | |
| 2023/0021272 | A1 | 1/2023 | Hernandez | |
| 2024/0130546 | A1 * | 4/2024 | Johnston | H02J 7/0042 |

FOREIGN PATENT DOCUMENTS

| | | | | |
|---|---|---|---|---|
| EP | 3 333 672 B1 | 9/2020 | |
| ES | 2 631 916 T3 | 9/2017 | |
| JP | 2004/057261 A | 2/2004 | |
| RU | 2229278 C1 | 5/2004 | |
| TW | 201126377 A | 8/2011 | |
| WO | WO-9301951 A1 * | 2/1993 | B60N 2/4876 |
| WO | WO 2013/134388 A1 | 9/2013 | |
| WO | 2014149954 A1 | 9/2014 | |
| WO | WO-2019230304 A1 * | 12/2019 | A47C 31/006 |
| WO | WO 2021/164700 A1 | 8/2021 | |
| WO | WO 2023/009393 A1 | 2/2023 | |
| WO | WO 2023/018865 A1 | 2/2023 | |
| WO | WO 2023/102088 A1 | 6/2023 | |
| WO | WO-2023131711 A1 * | 7/2023 | B60N 2/809 |

OTHER PUBLICATIONS

Case, Amber et al., "Opportunities in Sound Design," Designing with Sound, Nov. 2018, https://www.oreilly.com/library/view/designing-with-sound/9781491961094/ch01.html, 14 pages, O'Reilly Media, Inc.
Goyal, Madhav et al., "Meditation Programs for Psychological Stress and Well-being A Systematic Review and Meta-analysis", JAMA Intern Med, Mar. 2014, vol. 174, No. 3, pp. 357-368.
"Frequently Asked Questions," Hugimals World, https://www.hugimalsworld.com/a/faq, downloaded May 3, 2023, 4 pages.
Vibro-Tactile Animal—Small—BrainMaster Technologies Inc., BrainMaster Technologies, https://brainmaster.com/product/vibro-tactile-animal-small/, downloaded May 3, 2023, 3 pages.
Von Muggenthaler, Elizabeth, "The felid purr: A healing mechanism?," J Acoust Soc Am, Nov. 1, 2001, vol. 110, p. 2666.
Von Schulze, Alex T. et al., "Heat therapy: possible benefits for cognitive function and the aging brain", J Appl Physiol, Sep. 24, 2020, vol. 129, 2020, pp. 1468-1476.
"What Are Weighted Blankets Made of?," Luna, Aug. 2, 2022, https://www.lunablanket.com/blogs/news/what-are-weighted-blankets-made-of, 8 pages.
"User manual Original instructions for Somnox 2: Breathe & Sleep Robot", May 2022, 38 pages.
"Frequently asked questions about Somnox", Somnox Support, https://somnox.com/f-a-q, downloaded Feb. 8, 2024, 10 pages.
"Somnox Sleep Robot User Manual", 2020, 28 pages.
Van Oers, Muriël et al., "Somnox Sleep Robot Scientific Background", Jun. 2019, 17 pages.
International Search Report and Written Opinion, PCT/US2024/027100, mailed Sep. 25, 2024.

* cited by examiner

SOOTHING VIBROTACTILE CUDDLE DEVICE

CROSS-REFERENCE TO RELATED APPLICATIONS

This application claims priority to U.S. Provisional Application No. 63/499,694, filed May 2, 2023, titled "SOOTHING VIBROTACTILE CUDDLE TOY," the disclosure of which is incorporated herein by reference in its entirety for all purposes.

BACKGROUND

Field

The field relates to therapeutic plush devices. More specifically, the field relates to sensory plush devices including vibrotactile components.

Description of Related Art

Vibrotactile components include transducers which can be provided within plush devices to deliver a vibratory effect on the user. Within media devices, the vibratory effect is intended to allow the user to feel the sound of the music. Within plush devices, the vibratory effect may be used for sensory stimulation. Weighted blankets and weighted toys can provide the user with a feeling of safety or security and can result in deep pressure stimulation. Heating pads and soft fabrics in plush devices can additionally provide somatosensory stimulation. However, a plush device, usable by children and adults, with multi-feature therapeutic elements like a substantive vibrotactile component, weights, a heating pad, and soft fabrics for providing a comprehensive soothing sensory device that further conveys possible healing features is not currently available. Accordingly, there remains a continuing need for a comprehensive soothing plush device.

SUMMARY

In one aspect, a soothing device includes: a vibrotactile contact surface at a first side of the soothing device, the vibrotactile contact surface configured to be placed in contact with a body of a user; an outer shell comprising a padding cover surface separate from the vibrotactile contact surface; a vibrotactile material disposed at the vibrotactile contact surface; at least one transducer configured to couple vibrations into the vibrotactile material, wherein the vibrotactile material is configured to transmit the vibrations of the at least one transducer into the body of the user when the vibrotactile contact surface is in contact with the body of the user; a controller coupled to the at least one transducer, wherein the controller is configured to receive an input signal from a communication protocol and to transmit a first output signal to the at least one transducer, the controller further comprising a memory unit; at least one sensor for receiving external information to generate a response for adjusting an operation of the soothing device; a power source configured to provide power to the controller and the at least one transducer; and a padding material at least partially encapsulating the at least one transducer and the controller, wherein the padding material is configured to dampen the vibrations, wherein the padding material is positioned between the padding cover surface and the at least one transducer.

In some embodiments, the padding material comprises an acoustical foam. In some embodiments, the vibrations have a frequency of at least 20 Hz. In some embodiments, the controller is configured to transmit a second output signal to an audio device, wherein the second output signal is a wired or wireless signal. In some embodiments, the audio device comprises headphones, earbuds, or bone conduction headphones. In some embodiments, the second output signal comprises a sleep sound, a sleep message, a meditation sound, a meditation message, a story, a therapeutic sound, or a therapeutic message. In some embodiments the vibrotactile material comprises at least one of a microcellular elastomer, a polyurethane, a rubber, or a microcellular polyurethane. In some embodiments, the soothing device further comprises a heating pad disposed at least at the first side of the soothing device, proximate to the vibrotactile contact surface. In some embodiments the soothing device further comprises weights, configured to simulate a weight of a cat, a weighted cuddle toy, or a weighted blanket. In some embodiments, the power source comprises a rechargeable battery configured to be charged through conductive or inductive charging. In some embodiments, the soothing device further comprises a cover configured to have a shape of a cushion, a pad, a cat, a cuddle toy, or a vehicle. In some embodiments, the input signal is configured to adjust at least one of a power state, a volume, a run duration, a vibration intensity, or a vibration frequency. In some embodiments, the input signal comprises a user input communicated via a communication protocol to customize a vibration pattern generated by the at least one transducer. In some embodiments, the customization of the vibration pattern generated by the at least one transducer comprises decreasing a vibration frequency to deepen a perceived sound. In some embodiments, the memory unit is configured to store a library of sounds. In some embodiments, the soothing device further comprises a sound barrier material at least partially encapsulating the at least one transducer, wherein the sound barrier material is configured to dampen the vibrations, and wherein the sound barrier material is positioned between the padding material and the at least one transducer.

In another aspect, a vibrotactile plush device can include: a padding material at least partially surrounding a first region and a second region, wherein the first region is at a first side of the vibrotactile plush device and the second region is at a second side of the vibrotactile plush device, and wherein a cover at least partially encloses the padding material; at least one vibrotactile element comprising a transducer and a vibrotactile material, wherein the at least one vibrotactile element is disposed at the first region, and wherein the vibrotactile material is configured to transmit a plurality of vibrations of the transducer at one or more restorative frequencies to a body of a user, the vibrotactile material disposed between the transducer and the body of the user; a control unit coupled to the at least one vibrotactile element and disposed at the second region, wherein the control unit is configured to receive a plurality of input signals and to transmit a plurality of output signals; and a power source configured to provide power to the control unit and the transducer.

In some embodiments the padding material comprises an acoustical foam. In some embodiments, the padding material is not included between the transducer and a portion of an outer shell of the vibrotactile plush device, the portion of the outer shell configured to be placed into contact with the body of the user and to transmit the plurality of vibrations to the body of the user. In some embodiments, the plurality of vibrations has a restorative frequency value of at least 20 Hz.

In some embodiments, the plurality of vibrations has a restorative frequency value between 20 Hz and 150 Hz. In some embodiments, the plurality of output signals further comprises a first output signal, and wherein the controller is configured to transmit the first output signal to an audio device, the first output signal comprising a wired or wireless signal. In some embodiments, the audio device comprises headphones, earbuds, or bone conduction headphones. In some embodiments, the first output signal comprises a sleep sound, a sleep message, a meditation sound, a meditation message, a story, a therapeutic sound, or a therapeutic message. In some embodiments, the vibrotactile material comprises at least one of a microcellular elastomer, a polyurethane, a rubber, or a microcellular polyurethane. In some embodiments, the vibrotactile plush device further comprises a heating pad disposed at least at the first side of the vibrotactile plush device proximate to the body of the user. In some embodiments, the vibrotactile plush device further comprises weights configured to simulate a weight of a cat, a weighted cuddle toy, or a weighted blanket. In some embodiments, the power source comprises a rechargeable battery configured to be charged through conductive or inductive charging. In some embodiments, the cover is configured to have a shape of a cushion, a pad, a cat, a cuddle toy, or a vehicle. In some embodiments, the plurality of input signals is configured to adjust at least one of a power state, a volume, a run duration, a vibration intensity, or a vibration frequency. In some embodiments, the plurality of input signals comprises a user input communicated via a communication protocol to customize a vibration pattern generated by the transducer. In some embodiments, customization of the vibration pattern generated by the at least one transducer comprises decreasing a vibration frequency to deepen a perceived sound. In some embodiments, the vibrotactile plush device further comprises a memory unit, wherein the memory unit is configured to store a library of sounds. In some embodiments, the vibrotactile plush device further comprises a sound barrier material at least partially encapsulating the at least one vibrotactile element, wherein the sound barrier material is configured to dampen the plurality of vibrations, and wherein the sound barrier material is positioned between the padding material and the at least one vibrotactile element. In some embodiments, the vibrotactile plush device further comprises at least one sensor for receiving external information to generate a response for adjusting an operation of the vibrotactile plush device.

In another aspect, a vibrotactile device comprises a housing, the housing further comprising at least one transducer configured to generate a plurality of vibrations, at least one control unit configured to receive an input signal from a communication protocol and to transmit a first output signal to the at least one transducer, and a power source; a vibrotactile material disposed at least partially on a surface of the housing, wherein the vibrotactile material is configured to transmit the plurality of vibrations at one or more restorative frequencies to a body of a user; and a padding material at least partially encapsulating the housing, wherein the padding material is configured to dampen the plurality of vibrations.

In some embodiments, the padding material is not included between the housing and a portion of an outer shell of the vibrotactile device, the portion of the outer shell configured to be placed into contact with the body of the user and to transmit the plurality of vibrations to the body of the user. In some embodiments, the plurality of vibrations has a restorative frequency value of at least 20 Hz. In some embodiments, the at least one control unit is configured to transmit a second output signal to an audio device, wherein the second output signal is a wired or wireless signal. In some embodiments, the audio device comprises bone conduction headphones. In some embodiments, the second output signal comprises at least one of a sleep sound, a sleep message, a meditation sound, a meditation message, a story, a therapeutic sound, or a therapeutic message. In some embodiments, the vibrotactile material comprises at least one of a microcellular elastomer, a polyurethane, a rubber, or a microcellular polyurethane. In some embodiments, the power source comprises a rechargeable battery configured to be charged through conductive or inductive charging. In some embodiments, the input signal is configured to adjust at least one of a power state, a volume, a run duration, a vibration intensity, or a vibration frequency. In some embodiments, the input signal comprises a user input communicated via a communication protocol to customize a vibration pattern generated by the at least one transducer. In some embodiments, the customization of the vibration pattern generated by the at least one transducer comprises decreasing a vibration frequency to deepen a perceived sound. In some embodiments, the at least one control unit further comprises a memory unit, wherein the memory unit is configured to store a library of sounds. In some embodiments, the vibrotactile device further comprises a sound barrier material at least partially encapsulating the housing, wherein the sound barrier material is configured to dampen the plurality of vibrations, wherein the sound barrier material is positioned between the padding material and the housing, and wherein the sound barrier material is not included between the surface of the housing and the vibrotactile material. In some embodiments, the vibrotactile device further comprises at least one sensor for receiving external information to generate a response for adjusting an operation of the vibrotactile device.

In another aspect, a method of operating a vibrotactile plush device can include: providing power to at least one controller and at least one vibrating transducer within the vibrotactile plush device; sending a first signal from a communication protocol to the at least one controller, wherein the first signal comprises instructions for operating the at least one vibrating transducer; and transmitting a plurality of vibrations from the at least one vibrating transducer through at least a vibrotactile material disposed between the at least one transducer and a body of a user according to the first signal.

In some embodiments, sending the first signal can further comprise controlling an intensity and a frequency of the plurality of vibrations. In some embodiments, sending the first signal can further comprise controlling a run duration of the plurality of vibrations. In some embodiments, sending the first signal further comprises sending a user input communicated via a communication protocol to customize a vibration pattern generated by the vibrating transducer.

In another aspect, a method of forming a vibrotactile plush device can include: providing an outer shell, wherein the outer shell comprises a padding cover surface and a vibrotactile contact surface; placing the vibrotactile contact surface at a first side of the vibrotactile plush device, wherein the vibrotactile contact surface is configured to be placed in contact with a body of a user; providing a vibrotactile material at the vibrotactile contact surface; providing at least one transducer configured to couple vibrations into the vibrotactile material, wherein the vibrotactile material is configured to transmit the vibrations of the at least one transducer into the body of the user when the vibrotactile contact surface is in contact with the body of the user; coupling a controller to the at least one transducer, wherein the controller is configured to receive an input signal from a communication protocol and to transmit a first output signal to the at least one transducer; coupling a memory unit to the controller; providing a power source configured to provide power to the controller and the at least one transducer; and providing a padding material at least partially encapsulating the at least one transducer and the controller, wherein the padding material is configured to dampen the vibrations, and wherein providing the padding material comprises positioning the padding material between the padding cover surface and the at least one transducer.

In some embodiments, the method further comprises providing at least one sensor for receiving external information for adjusting an operation of the vibrotactile plush device. In some embodiments, the input signal comprises a user input communicated via a communication protocol to customize a vibration pattern generated by the at least one transducer, and wherein the input signal is configured to adjust at least one of a power state, a volume, a run duration, a vibration intensity, or a vibration frequency.

BRIEF DESCRIPTION OF THE DRAWINGS

Like reference numbers are used to refer to like features throughout the description and drawings.

DETAILED DESCRIPTION

Scientific research indicates that low-frequency vibrations may have therapeutic or healing effects. In one study on bone repair after injury, beneficial frequencies were determined to be from about 25 Hz to about 50 Hz. These and other frequencies (also referred to as restorative frequencies or restorative frequency values herein) falling in a range of about 25 Hz to about 150 Hz are used in pain relief and treatment of dyspnea, wounds, and more. This range of frequencies also corresponds to the frequencies of cat purrs. In addition to the possible physical therapies associated with cat purrs, cat purrs are also associated with calming effects in humans and can aid in stress relief. Sound resonation, generally, has been shown to viscerally stimulate the parasympathetic nervous system, decreasing stress and anxiety in recipients of this sound resonation.

In other scientific research, weighted cuddle toys and weighted blankets can provide sensory stimulation (e.g., deep pressure stimulation), facilitating the release of oxytocin, a neurotransmitter associated with positive well-being and anti-stress. Additionally, evidence shows that meditation can reduce psychological stress, with one study finding moderate evidence of improved anxiety, depression, and pain in response to meditation programs. Heat therapy is also known to provide human benefits, both physical and psychological.

Therefore, a plush device or cuddle toy comprising at least a vibrotactile component capable of transmitting vibrations at restorative frequencies, a comforting plush interior to hold onto while receiving the vibrations, and a calming or attractive exterior cover would greatly benefit both human children and adults. Such a cuddle toy further including weights and a heating pad would elevate the utility and functionality of the device, providing a unique and powerful fusion of human benefits.

Figure 1A:
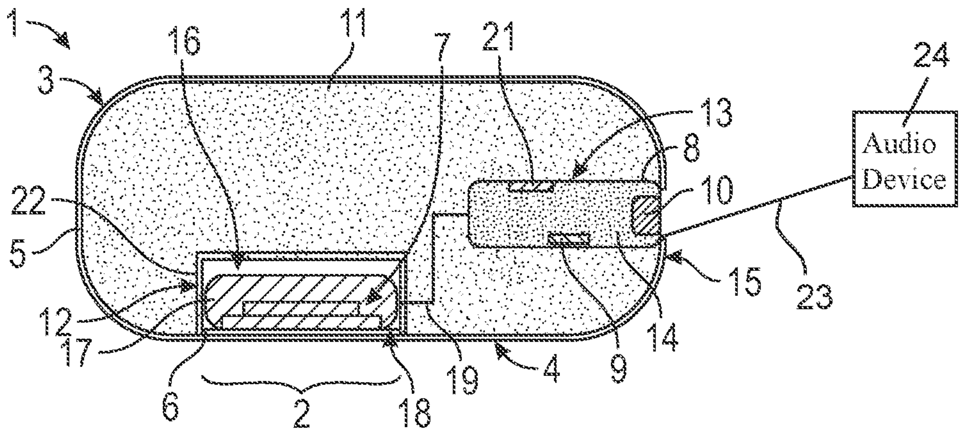
FIG. 1A is a schematic side sectional view of a vibrotactile plush device, according to one embodiment.

Various embodiments disclosed herein relate to vibrotactile plush devices, which may sometimes be referred to as "soothing devices" or "vibrotactile devices." FIG. 1A illustrates a side schematic cross-sectional view of a vibrotactile plush device 1, according to one embodiment. In FIG. 1A, the vibrotactile plush device 1 comprises a padding material 11, a sound barrier material 22, a first region 12 at a first side 4 of the vibrotactile plush device 1 and a second region 13 at a second side 15 of the vibrotactile plush device 1, such that the padding material 11 at least partially surrounds the first and second regions, 12, 13.

In the configuration shown in FIG. 1A, a vibrotactile element 16 is disposed at the first region 12, comprising a transducer 7 and a vibrotactile material 6. The transducer 7 can be a vibrating mechanical actuator or an electroacoustic transducer. For example, the transducer 7 can be a bone conducting-type transducer. In one embodiment, the transducer 7 can vibrate at a frequency (e.g., a restorative frequency value) of at least 20 Hz. In one embodiment, the transducer 7 can vibrate at a frequency of 25 Hz. In another embodiment the transducer 7 can vibrate at a frequency within a range of 20 Hz and 150 Hz. Still, in other embodiments, the transducer 7 can vibrate at a frequency greater than 150 Hz. An advantage is that a user can possibly experience health benefits from the vibrotactile plush device 1 imparting such frequencies to the user's body. Such possible health benefits can include improved mental well-being and physical benefits such as improved bone health. Although the vibrotactile device 1 of FIG. 1A includes one transducer 7, in other embodiments, the vibrotactile device 1 can comprise multiple transducers.

In the configuration shown in FIG. 1A, padding material 11 is not included between the transducer 7 and the vibrotactile material 6, and the padding material 11 is not included between the vibrotactile material 6 and a vibrotactile contact surface 2. The vibrotactile contact surface 2 is a portion of an outer shell 5 that encapsulates the device 1. The outer shell 5 further comprises a padding cover surface 3, such that the padding cover surface 3 and vibrotactile contact surface 2 are different portions of the outer shell 5. The padding cover surface 3 is disposed over the padding material 11 (i.e., the cover at least partially encloses or encases the padding material 11). The vibrotactile contact surface 2 is disposed at the first side 4 of the vibrotactile plush device 1, and the vibrotactile material 6 is disposed at the vibrotactile contact surface 2. A user (e.g., a child or an adult) can place the vibrotactile contact surface 2 of the vibrotactile plush device 1 in contact with the user's body. For example, the user can place the vibrotactile contact surface 2 of the device 1 proximate to the user's chest (e.g., sternum) or abdomen. In this configuration, the padding material provides a user with the ability to hold onto the vibrotactile plush device 1 comfortably, and the placement of the padding material does not impede the delivery of the vibrations from the transducer 7 through the vibrotactile material 6 disposed at the vibrotactile contact surface 2.

The vibrotactile material 6 is a thin layer of material that transmits the vibrations of the transducer 7. For example, the vibrotactile material 6 can have a thickness of approximately ⅛ of an inch. In other examples, the vibrotactile material 6 can have a thickness from ⅛ of an inch to ¼ of an inch. In some embodiments, the thickness of the vibrotactile material 6 can be less than ⅛ of an inch or greater than ¼ of an inch. The vibrotactile material 6 can be a microcellular elastomer, a polyurethane, a rubber, a microcellular polyurethane, or other such material suitable for transmitting the vibrations to a user's body. In some embodiments, the vibrotactile material 6 comprises one of the materials described above. In other embodiments, the vibrotactile material 6 can be a combination of two or more of the materials described above.

The padding material 11 can be a foam, such as an acoustical foam. In another embodiment, the padding material 11 can be a memory foam, providing comfort to the user and warming the user, owing to the denseness of the material, which traps body heat. In other embodiments, the padding material 11 can include at least one of a foam, a padding, or a fabric of substantial thickness similar to what would be present in a cuddle toy. The padding material 11 dampens the vibrations or sound emitted from the transducer 7 such that the effects of the transducer 7 are focused on the user and are non-disruptive or minimally disruptive to others who are nearby the user. Because of the dampening effects of the padding material 11, others who are nearby the user cannot hear the vibrations or sound from the vibrotactile device 1 or may hear the vibrations or sound at a very low volume.

The sound barrier material 22 is disposed between the vibrotactile element 16 and the padding material 11, and the sound barrier material 22 is not included between the vibrotactile element 16 and the vibrotactile contact surface 2. The sound barrier material 22 dampens the vibrations or sound emitted from the transducer 7. In some embodiments the sound barrier material 22 comprises mass loaded vinyl (MLV). In some embodiments the sound barrier material 22 has a thickness of approximately ¼ of an inch. In other embodiments, the sound barrier material 22 can have a thickness greater than ¼ of an inch or less than ¼ of an inch. The sound barrier material 22 is configured to act as an additional dampening layer, minimizing the vibrations or sound from the vibrotactile plush device 1 from reaching non-users in the vicinity of the user.

In some embodiments, the cover can take the shape of a cat. An advantage of such a cover on the vibrotactile plush device 1 is that users who are allergic to cats or live in households with family members or other residents presenting with cat allergies can enjoy the health benefits and companionship of a device that can resemble a cat and output a therapeutic, cat-like purr. In some embodiments, the cover can take the shape of a cushion, a pad, a cat, a cuddle toy, or a vehicle (e.g., a car, plane, train, boat, etc.). In one embodiment, the cover is the outer shell 5 of the device 1. In another embodiment, the cover is separate from and disposed over the outer shell 5 of the device 1, which enables the user to remove the cover for cleaning or sanitization.

A control unit 8 is disposed at the second region 13, and it comprises a controller 14, a power source 10, and a memory unit 9. In one embodiment the power source 10 provides power to the vibrotactile plush device 1. The vibrotactile plush device 1 can include a power source comprising a rechargeable battery, which can be charged through conductive or inductive charging. In one example, the device 1 can be charged or recharged inductively by setting the device 1 onto a battery charging plate, allowing for automatic charging. In another embodiment, the device 1 can be charged through conductive charging, which can include charging the device through a USB connection or power jack. The memory unit 9 is configured to store information pertinent to operating the device 1. For example, the memory unit 9 can store a library of sounds to be played on the device 1. In another example, the memory unit 9 can retain information regarding the sound and run duration from one use to another use, unless the user changes the settings. Thus, the user does not have to reset the vibrotactile plush device 1 to their desired settings each time the device 1 is to be used. In some embodiments, the control unit comprises a tone or bass controller that facilitates an increase or decrease in the amount of bass in the sound. In such embodiments, the tone or base controller allows for adjusting the vibrations.

In the configuration in FIG. 1A, the control unit 8 and the vibrotactile element 16 are electrically connected through a wire 19, facilitating transmission of a first output signal to the vibrotactile element 16. In some embodiments, the control unit 8 can also include a physical on/off switch for turning the vibrotactile device 1 on or off. In some embodiments, the user can adjust the volume of the vibrotactile device 1 through a physical volume element disposed at a surface of the control unit 8 external to the device 1. The first output signal instructs the transducer 7 to transmit vibrations of a specific frequency and amplitude. In one embodiment, the controller 14 transmits a plurality of output signals. A communication protocol provides input signals to the control unit 8. The communication protocol allows a user to link or connect their vibrotactile plush device 1 to other electronic devices such as cellular phones, tablets, computers (including laptops and desktops), and the like.

In one embodiment, the controller 14 transmits a second output signal that can be a wired or wireless signal 23 to an audio device 24, such as headphones, earbuds, or bone conduction headphones. The second output signal can comprise a variety of sounds or messages. For example, the second output signal can be a sound that helps soothe one to sleep (e.g., a sleep sound). In another example, the second output signal can be a meditation sound, suitable for meditating. In another example, the second output signal can be a therapeutic sound, imparting calming or soothing sounds to the user of the vibrotactile device 1. In another example, the second output signal can comprise messages, such as sleep messages, meditation messages, or therapeutic messages, wherein each is intended to produce a soothing or calming effect on the user. In another example, the second output signal can be a story. For instance, the story may be a pre-recorded story in a parent's voice that can be played to a child through the device.

In some embodiments, the vibrotactile device 1 can further comprise one or more sensors 20, 21 for receiving external information to generate a response for adjusting an operation of the vibrotactile device 1. The external information can include an orientation or a position of the vibrotactile device 1, a breathing pattern or a breathing rate of the user, and more. Adjusting an operation of the vibrotactile device 1 can include adjusting at least one of a power state (e.g., turning the device on or off), a volume, a run duration, a vibration intensity, a vibration frequency, etc. The one or more sensors 20, 21 can be configured to receive the external information and to send a signal to the control unit 8 to turn the vibrotactile device 1 on or off in response to the external information. For example, a first sensor 21 can be configured to detect if the vibrotactile device 1 has fallen off a sleeping child or adult (i.e., receive external information) and transmit a signal to the control unit 8 to turn the vibrotactile device 1 off. In some embodiments, the first sensor 21 is a gyroscope sensor disposed in the control unit 8 and senses device position. In another example, a second sensor (not shown) can be configured to detect if the user is crying and to transmit a signal to the control unit 8 to turn the vibrotactile device 1 on. In another example, and as shown in FIG. 1C, a third sensor 20 can be disposed at the bottom of the vibrotactile device 1. In some embodiments, this third sensor 20 can be a piezoelectric sensor configured to detect a user's breathing pattern, enabling the vibrotactile device 1 to produce a sound output that matches the breathing pattern detected by the third sensor 20. For example, a sound or plurality of sounds can be loaded into the device 1 and software can be configured to adjust the sound to match the breathing pattern detected by the third sensor 20. In some examples, this sound output can be a cat purr.

In the illustrated embodiment of FIGS. 1A and 1C, the vibrotactile device 1 can comprise at least one sensor 20, 21. The inclusion of at least one sensor 20, 21 makes possible the creation of a feedback system that enables the vibrotactile device 1 to operate in various manners depending on the inputs received from the at least one sensor 20, 21. As described above, the vibrotactile device 1 can include a variety of sensors 20, 21 that enable the vibrotactile device 1 to detect various inputs, which reduces the need for constant non-user supervision or intervention to make sure the vibrotactile device 1 has been turned on or off depending on the user's state and which helps reduce the device's power consumption during inactive phases (e.g., when a child has fallen asleep). Although the vibrotactile device 1 of FIGS. 1A and 1C illustrate the inclusion of two sensors 20, 21, more or fewer sensors can be included.

In some embodiments, a website comprising a library of sounds can be used in combination with the vibrotactile device 1. A community of users utilizing this website can communicate and compare their experiences with the vibrotactile device, which can help improve the experiences for other users of the device. The website can additionally facilitate uploading sounds, messages, and stories such that other users of the website and device can partake in these shared sounds, messages, and stories. In some embodiments, the sounds, messages, and stories are user-created. The library of sounds can be downloaded to the vibrotactile device 1. In one embodiment, the library of sounds comprises sound alternatives. For example, a user can take a sound or message (e.g., a pre-existing or newly recorded custom personal message, mantra, or story) and lower its frequency, to deepen a perceived sound or message (e.g., decreasing the vibration frequency of the vibrational pattern), which may increase soothing qualities when transmitted or played back through the vibrotactile device 1.

In some embodiments, the communication protocol is a part of a mobile application that facilitates comprehensive remote or wireless control of the sounds. The mobile application can include a variety of user controls to be operated with the device. For example, from the mobile application in one embodiment, the user could control the power state (e.g., turn on/off) of the vibrotactile plush device 1, the volume, the time played, the sequence of sounds played, loading sounds (including a library of sounds) onto the vibrotactile device 1, the vibration or percussion intensity, the vibration frequency, streaming sounds with Bluetooth® and/or Wi-Fi, and setting parental controls (e.g., a volume limit and vibration intensity limit for babies and children).

Although FIG. 1A illustrates the first side 4 being different from the second side 15, in some embodiments the first side 4 can be the same as the second side 15 of the vibrotactile plush device 1. Moreover, the vibrotactile plush device 1 can comprise a variety of sizes or dimensions. In one embodiment, the vibrotactile device 1 has the dimensions of six inches wide by nine inches long by three and a half inches in height. In another embodiment, the vibrotactile plush device 1 has the dimensions of eight inches wide by eleven inches in length by five inches in height. The size or dimension of the vibrotactile plush device 1 can vary so as to correspond to users of varying sizes (e.g., a child or an adult), improving the soothing or calming effect of the vibrotactile device 1 for users of different sizes.

In some embodiments, the vibrotactile plush device 1 comprises a heating pad disposed at least at the first side 4 of the soothing device 1. The heating pad facilitates warming the foam base of the vibrotactile plush device 1. In one embodiment, the warmth of the heating pad simulates the warmth of a cat.

In some embodiments, the vibrotactile plush device 1 comprises weights. In one embodiment, the weights can be disposed at least at the first side 4 of the vibrotactile plush device 1. The weights can comprise beads (e.g., micro glass beads or steel beads), grains, plastic poly pellets, sand, pebbles, etc. In one embodiment, the weights comprise a weight simulating that of a cat, a weighted cuddle toy, or a weighted blanket. In some embodiments, the weights can vary between 1 pound and 5 pounds. In other embodiments, the weights can weigh between 1 pound and 10 pounds. In some embodiments the weights can be customized and weigh up to 10% of the user's weight. A weighted vibrotactile plush device 1 can replicate the secure feeling a user could receive with a weighted blanket but have the smaller and more portable feature of a cuddle toy.

Figure 1B:
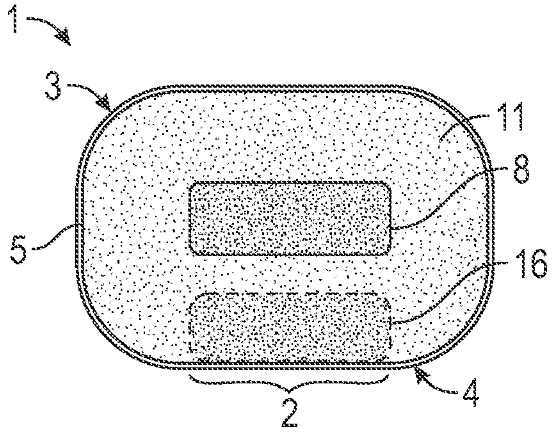
FIG. 1B is a schematic front sectional view of a vibrotactile plush device, according to one embodiment.
Figure 1C:
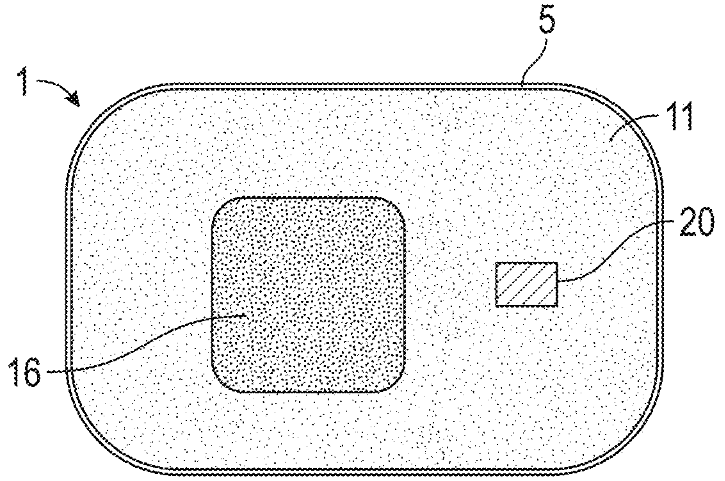
FIG. 1C is a schematic bottom sectional view of a vibrotactile plush device, according to one embodiment.

FIGS. 1B-C illustrate a front cross-sectional view and a bottom cross-sectional view of the vibrotactile plush device 1 of FIG. 1A, respectively. In FIG. 1B the control unit 8 is positioned in a plane above that of the vibrotactile element 16. The vibrotactile element 16 is illustrated to be positioned deeper within the soothing device 1 as compared to the control unit 8, and the vibrotactile element 16 is disposed at the first side 4 of the soothing device 1, corresponding to the vibrotactile contact surface 2. In FIG. 1C, a bottom cross-sectional view of the vibrotactile element 16 is depicted. The vibrotactile material 6 is disposed at this surface such that vibrations generated by the transducer 7 are transmitted to the body of a user through the vibrotactile material 6.

Figure 2:
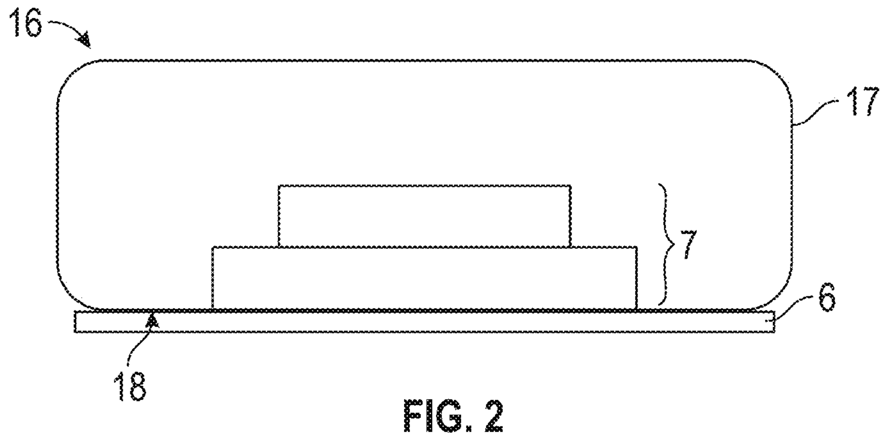
FIG. 2 is a schematic side sectional view of a vibrotactile element, according to one embodiment.

FIG. 2 illustrates a schematic side cross-sectional view of the vibrotactile element 16 of FIG. 1A. In FIG. 2, the vibrotactile element 16 comprises a housing 17, the housing 17 further comprising the transducer 7. A vibrotactile material 6 is coupled to the surface of the housing 18. In some embodiments, the vibrotactile material 6 comprises a soft layer of foam, rubber, or latex. In some embodiments, the transducer is located in a transducer box comprising a hard plastic surface. In some embodiments, the vibrotactile material 6 can be disposed under the hard plastic surface, which can dampen strong vibrations from the transducer 7 to a comfortable or tolerable amount on the user.

Figure 3:
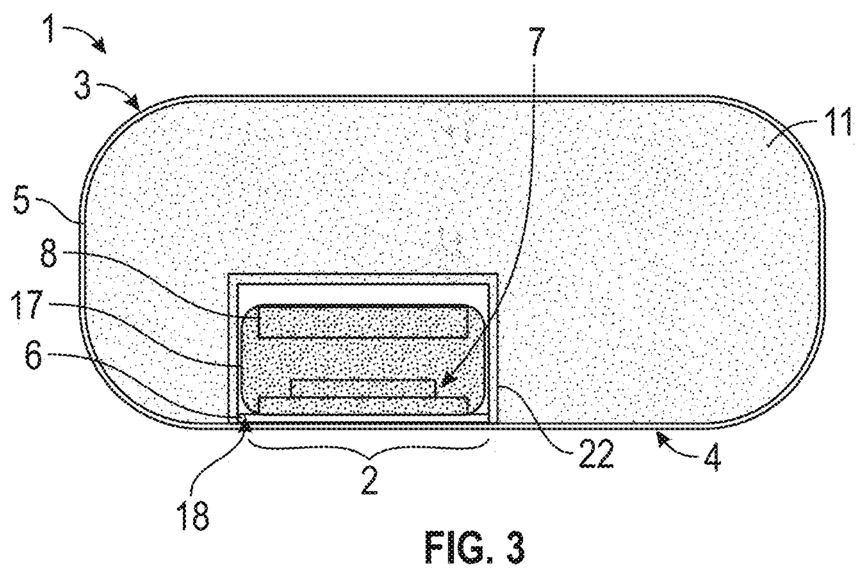
FIG. 3 is a schematic side sectional view of a vibrotactile plush device, according to one embodiment.

FIG. 3 illustrates another embodiment of the vibrotactile plush device 1 shown in FIG. 1A. Unless otherwise noted, the elements of FIG. 3 are the same as or generally similar to the elements of FIG. 1A, and alternatives noted above with respect to FIG. 1A are likewise applicable to the embodiment of FIG. 3. In FIG. 3, the vibrotactile plush device 1 comprises a padding material 11, a sound barrier material 22, and a housing 17, the housing 17 further comprising a transducer 7, a vibrotactile material 6 disposed at a surface of the housing 18, and a control unit 8. Unlike in FIG. 1A, in FIG. 3, the transducer 7 and control unit 8 can be combined in one housing 17, as shown. Consequently, no padding material 11 is disposed between the transducer 7 and control unit 8. In this configuration, the vibrotactile contact surface 2 is a portion of an outer shell 5 that encapsulates the soothing device 1. The outer shell 5 further comprises a padding cover surface 3, such that the padding cover surface 3 and vibrotactile contact surface 2 are different portions of the outer shell 5. The padding cover surface 3 is disposed over the padding material 11, the vibrotactile contact surface 2 is disposed at the first side 4 of the vibrotactile plush device 1, and the vibrotactile material 6 is disposed at the vibrotactile contact surface 2, corresponding to a surface of the housing 18. In some embodiments, the housing 17 is removable. In such an embodiment, the localization of the transducer 7 and the control unit 8 to a single location or region within the vibrotactile device 1 affords an advantage of maintaining the devices within a single housing within the plush device. When in a single housing, the entirety of the hardware system can be facilely removed from the plush device, improving the feasibility of cleaning or sanitizing the remaining portion of the plush device (e.g., placing the remaining portion of the plush device into a washing machine).

Figure 4:
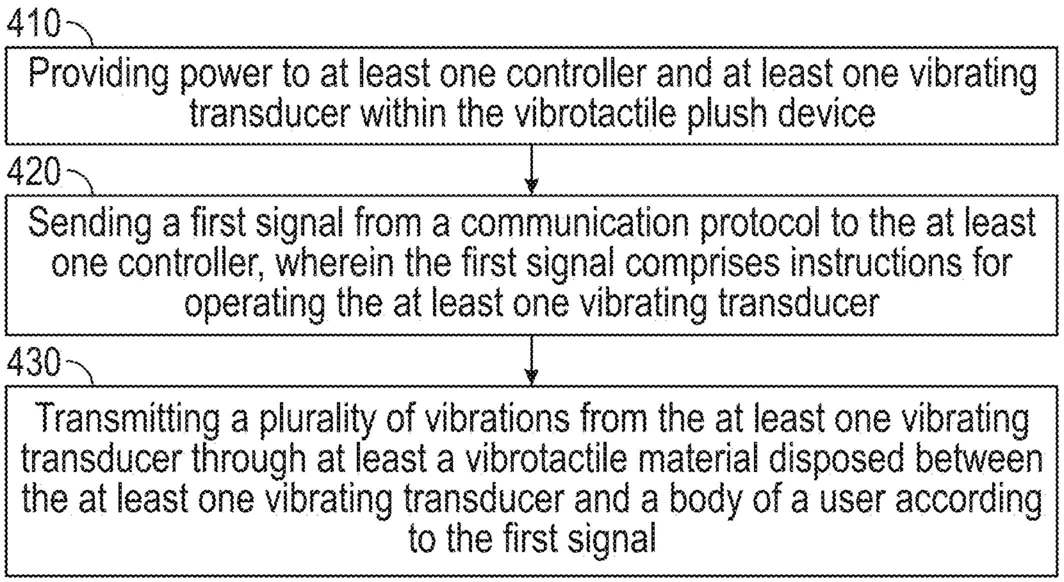
FIG. 4 is an example method of operating a vibrotactile plush device, according to one embodiment.

FIG. 4 illustrates an example method of operating a vibrotactile plush device 1. Individual operations are shown in each block. Unless otherwise noted, vibrotactile plush device 1 elements included within the method of FIG. 4 are the same as or generally similar to the elements of FIGS. 1 through 3, and alternatives noted above with respect to the apparatus elements of FIGS. 1 through 3 are likewise applicable to the method disclosed in FIG. 4. Block 410 presents a step comprising providing power to at least one controller 14 and at least one vibrating transducer 7 within the vibrotactile plush device 1. Block 420 presents a step comprising sending a first signal from a communication protocol to the at least one controller 14, wherein the first signal comprises instructions for operating the at least one vibrating transducer 7. The first signal can comprise instructions for controlling an intensity, frequency, and/or run duration of the plurality of vibrations. The first signal can further comprise sending a user input communicated via a communication protocol to customize a vibration pattern generated by the at least one vibrating transducer 7. Block 430 presents a step comprising transmitting a plurality of vibrations from the at least one vibrating transducer 7 through at least a vibrotactile material 6 disposed between the at least one vibrating transducer 7 and a body of a user according to the first signal.

Figure 5:
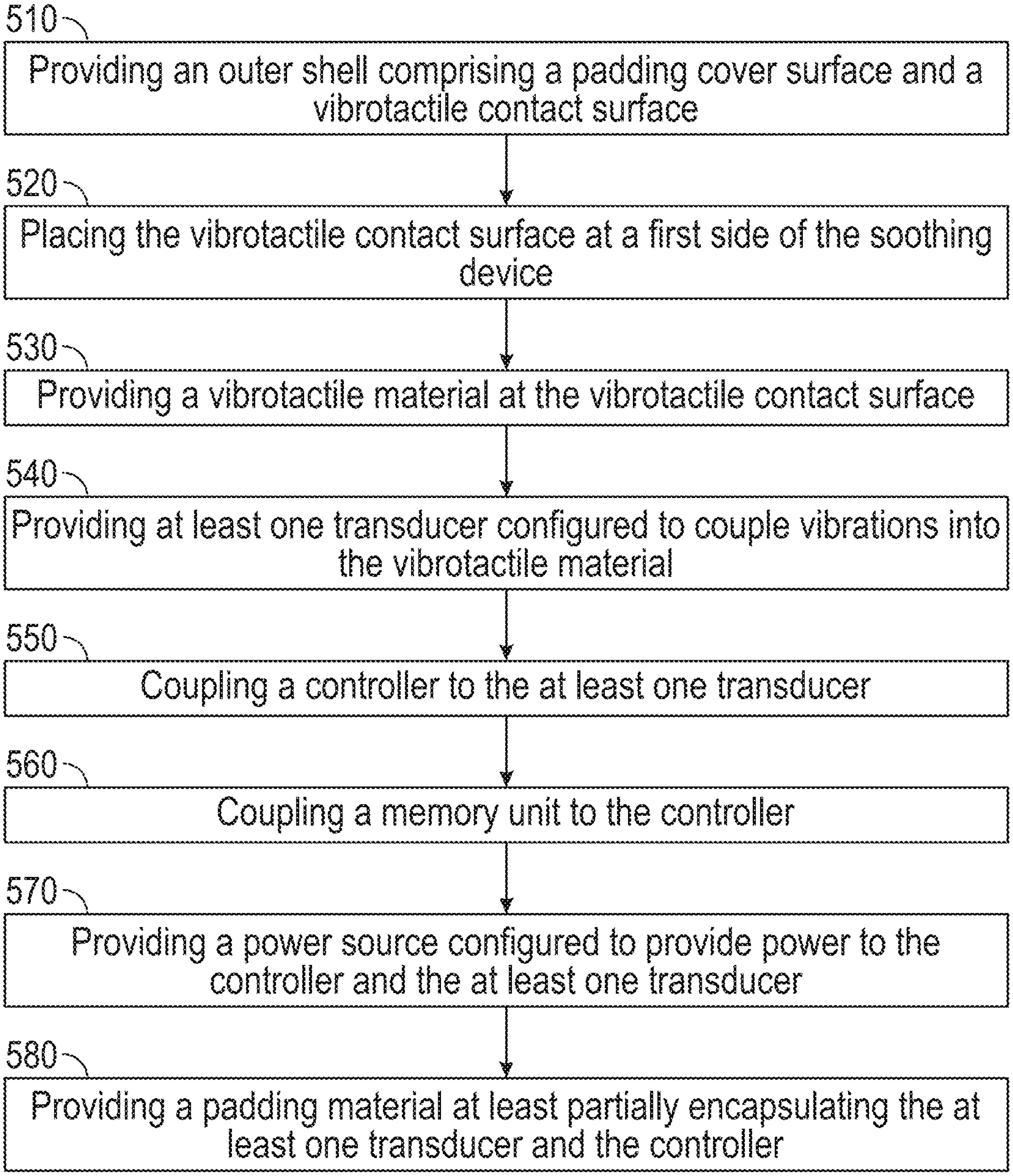
FIG. 5 is an example method of forming a vibrotactile plush device, according to one embodiment.

FIG. 5 illustrates an example method of forming a vibrotactile plush device 1. Individual operations are shown in each block. Unless otherwise noted, vibrotactile plush device 1 elements included within the method of FIG. 5 are the same as or generally similar to the elements of FIGS. 1 through 3, and alternatives noted above with respect to the apparatus elements of FIGS. 1 through 3 are likewise applicable to the method disclosed in FIG. 5. Block 510 presents a step comprising providing an outer shell 5, wherein the outer shell 5 comprises a padding cover surface 3 and a vibrotactile contact surface 2. Block 520 presents a step comprising placing the vibrotactile contact surface 2 at a first side 4 of the soothing device 1, wherein the vibrotactile contact surface 2 is configured to be placed in contact with a body of a user. Block 530 presents a step comprising providing a vibrotactile material 6 at the vibrotactile contact surface 2. Block 540 presents a step comprising providing at least one transducer 7 configured to couple vibrations into the vibrotactile material 6, wherein the vibrotactile material 6 is configured to transmit the vibrations of the at least one transducer 7 into the body of the user when the vibrotactile contact surface 2 is in contact with the body of the user. Block 550 presents a step comprising coupling a controller 14 to the at least one transducer 7, wherein the controller 14 is configured to receive an input signal from a communication protocol and to transmit a first output signal to the at least one transducer 7. In some embodiments, the input signal can include a user input communicated through the communication protocol to customize a vibration pattern to be generated by the at least one transducer 7. In some embodiments, the input signal can be configured to adjust a power state, a volume, a run duration, a vibration intensity, or a vibration frequency of the vibrotactile device 1. Block 560 presents a step comprising coupling a memory unit 9 to the controller 14. Block 570 presents a step comprising providing a power source 10 configured to provide power to the controller 14 and the at least one transducer 7. Block 580 presents a step comprising providing a padding material 11 at least partially encapsulating the at least one transducer 7 and the controller 14, wherein the padding material 11 is configured to dampen the vibrations, and wherein providing the padding material 11 comprises positioning the padding material 11 between the padding cover surface 3 and the at least one transducer 7.

In some embodiments, the method of forming a vibrotactile plush device 1 can include providing at least one sensor 20, 21. These sensors 20, 21 can be configured to receive external information for adjusting an operation of the vibrotactile plush device 1. For example, the method can include providing a sensor 20, 21 configured to detect a relative orientation or position of the vibrotactile plush device 1 and can instruct the vibrotactile plush device 1 to shut off or cease outputting vibrations from the at least one transducer 7 if the vibrotactile contact surface 2 is no longer in contact with the body of the user. Such a sensor can act as a power-saving feature of the vibrotactile plush device 1 when the vibrotactile features of the vibrotactile plush device 1 are not actively being used.

Unless the context clearly requires otherwise, throughout the description and the claims, the words "comprise." "comprising." "include," "including" and the like are to be construed in an inclusive sense (i.e., "including, but not limited to"), as opposed to an exclusive or exhaustive sense. The word "coupled." as generally used herein, refers to two or more elements that may be either directly connected, or connected by way of one or more intermediate elements. Likewise, the word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any of the items in the list, all of the items in the list, and any combination of the items in the list.

Moreover, conditional language used herein, such as, among others, “can,” “could,” “might.” “may,” “e.g.,” “for example.” “such as” and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

Although certain embodiments have been described, these embodiments have been presented by way of example only and are not intended to limit the scope of the disclosure. Indeed, the novel apparatus, methods, and systems described herein may be embodied in a variety of other forms; furthermore, various omissions, substitutions, and changes in the form of the methods and systems described herein may be made without departing from the spirit of the disclosure. It is also contemplated that various combinations or sub-combinations of the specific features and aspects of the embodiments may be made and still fall within the scope. The accompanying claims and their equivalents are intended to cover such forms or modifications as would fall within the scope and spirit of the disclosure.

What is claimed is:

1. A soothing device comprising:

a padding cover;

a padding material defining a padding recess in a planar bottom surface of the padding material, the bottom surface of the padding material sized and configured for being placed in contact with an interior surface of the padding cover;

a sound barrier material positioned within the padding recess;

a planar, non-padded vibrotactile material spanning an opening of the padding recess such that an exterior surface of the planar, non-padded vibrotactile material lies in the same plane as the bottom surface of the padding material and a bottom edge of the sound barrier material, the planar, non-padded vibrotactile material cooperating with the bottom surface of the padding material and the bottom edge of the sound barrier material to form a continuous planar surface for being placed in direct contact with the interior surface of the padding cover such that the padding cover is configured to encapsulate the padding material and the planar, non-padded vibrotactile material;

a rigid plastic housing positioned within the padding recess, a side wall of the housing in abutting contact with an opposing interior surface of the planar, non-padded vibrotactile material;

and at least one electroacoustic transducer positioned within the housing and coupled to an interior surface of the side wall of the housing, such that the side wall of the housing is sandwiched between the at least one electroacoustic transducer and the planar, non-padded vibrotactile material, the at least one electroacoustic transducer configured for selectively emitting sound vibrations through each of the side wall of the housing and the planar, non-padded vibrotactile material;

wherein the sound barrier material is sandwiched between the padding material and the rigid plastic housing;

whereby, during use of the device, with the bottom surface of the padding material positioned so that the exterior surface of the planar, non-padded vibrotactile material is in direct contact with the interior surface of the padding cover, an exterior surface of the padding cover configured to be placed in direct contact with a body of a user, the planar, non-padded vibrotactile material and rigid plastic housing cooperate to maximize sound vibrations produced by the electroacoustic transducer, thereby soothing the user.

2. The soothing device of claim 1, further comprising a controller in communication with the at least one electroacoustic transducer, the controller configured for transmitting an at least one output signal to be produced by the at least one electroacoustic transducer.

3. The soothing device of claim 2, further comprising at least one sensor for sensing external information and providing a signal to the controller in response to the external information, wherein the at least one output signal of the controller adjusts an operation of the soothing device in response to the external information.

4. The soothing device of claim 2, wherein the controller is configured to adjust at least one of a power state, a volume, a run duration, a vibration intensity, or a vibration frequency of the at least one electroacoustic transducer.

5. The soothing device of claim 2, wherein the controller is configured for receiving a user input to customize a vibration pattern generated by the at least one electroacoustic transducer.

6. The soothing device of claim 1, wherein the planar, non-padded vibrotactile material comprises at least one of a microcellular elastomer, a polyurethane, a rubber, or a microcellular polyurethane.

7. The vibrotactile plush device of claim 1, wherein the padding cover is configured to have a shape of a cushion, a pad, a cat, a cuddle toy, or a vehicle.

8. The vibrotactile device of claim 1, further comprising providing at least one weight positioned within the padding material.

9. The vibrotactile device of claim 1, wherein the planar, non-padded vibrotactile material has a thickness of approximately ⅛ of an inch.

10. A vibrotactile plush device comprising:

a padding cover:

a padding material defining a padding recess in a planar bottom surface of the padding material, the bottom surface of the padding material sized and configured for being placed in contact with an interior surface of a padding cover;

a sound barrier material positioned within the padding recess;

a planar, non-padded vibrotactile material spanning an opening of the padding recess such that an exterior surface of the planar, non-padded vibrotactile material lies in the same plane as the bottom surface of the padding material and a bottom edge of the sound barrier material, the planar, non-padded vibrotactile material cooperating with the bottom surface of the padding material and the bottom edge of the sound barrier material to form a continuous planar surface for being placed in direct contact with the interior surface of the padding cover such that the padding cover is configured to encapsulate the padding material and the planar, non-padded vibrotactile material;

a rigid plastic housing positioned within the padding recess, a side wall of the housing in abutting contact with an opposing interior surface of the planar, non-padded vibrotactile material;

and at least one electroacoustic transducer positioned within the housing and coupled to an interior surface of the side wall of the housing, such that the side wall of the housing is sandwiched between the at least one electroacoustic transducer and the planar, non-padded vibrotactile material, the at least one electroacoustic transducer configured for selectively emitting sound vibrations through each of the side wall of the housing and the planar, non-padded vibrotactile material;

wherein the sound barrier material is sandwiched between the padding material and the rigid plastic housing;

whereby, during use of the device, with the bottom surface of the padding material positioned so that the exterior surface of the planar, non-padded vibrotactile material is in direct contact with the interior surface of the padding cover, an exterior surface of the padding cover configured to be placed in direct contact with a torso of a user, the planar, non-padded vibrotactile material and rigid plastic housing cooperate to maximize sound vibrations produced by the electroacoustic transducer, thereby soothing the user.

11. The vibrotactile plush device of claim 10, further comprising a controller in communication with the at least one electroacoustic transducer, the controller configured for transmitting an at least one output signal to be produced by the at least one electroacoustic transducer.

12. The vibrotactile plush device of claim 11, further comprising at least one sensor for sensing external information and providing a signal to the controller in response to the external information, wherein the at least one output signal of the controller adjusts an operation of the soothing device in response to the external information.

13. The vibrotactile plush device of claim 11, wherein the controller is configured to adjust at least one of a power state, a volume, a run duration, a vibration intensity, or a vibration frequency of the at least one electroacoustic transducer.

14. The vibrotactile plush device of claim 11, wherein the controller is configured for receiving a user input to customize a vibration pattern generated by the at least one electroacoustic transducer.

15. The soothing device of claim 10, wherein the planar, non-padded vibrotactile material comprises at least one of a microcellular elastomer, a polyurethane, a rubber, or a microcellular polyurethane.

16. The vibrotactile plush device of claim 10, wherein the padding cover is configured to have a shape of a cushion, a pad, a cat, a cuddle toy, or a vehicle.

17. The vibrotactile plush device of claim 10, further comprising at least one weight positioned within the padding material.

18. A vibrotactile device comprising:

a padding cover:

a padding material defining a padding recess in a planar bottom surface of the padding material, the bottom surface of the padding material sized and configured for being placed in contact with an interior surface of the padding cover;

a sound barrier material positioned within the padding recess:

a planar, non-padded vibrotactile material spanning an opening of the padding recess such that an exterior surface of the planar, non-padded vibrotactile material lies in the same plane as the bottom surface of the padding material and a bottom edge of the sound barrier material, the planar, non-padded vibrotactile material cooperating with the bottom surface of the padding material and the bottom edge of the sound barrier material to form a continuous planar surface for being placed in direct contact with the interior surface of the padding cover such that the padding cover is configured to encapsulate the padding material and the planar, non-padded vibrotactile material;

a rigid plastic housing positioned within the padding recess, a side wall of the housing in abutting contact with an opposing interior surface of the planar, non-padded vibrotactile material;

and at least one electroacoustic transducer positioned within the housing and coupled to an interior surface of the side wall of the housing, such that the side wall of the housing is sandwiched between the at least one electroacoustic transducer and the planar, non-padded vibrotactile material, the at least one electroacoustic transducer configured for selectively emitting sound vibrations through each of the side wall of the housing and the planar, non-padded vibrotactile material;

at least one weight positioned within the padding material;

wherein the sound barrier material is sandwiched between the padding material and the rigid plastic housing;

whereby, during use of the device, with the bottom surface of the padding material positioned so that the exterior surface of the planar, non-padded vibrotactile material is in direct contact with the interior surface of the padding cover, an exterior surface of the padding cover configured to be placed in direct contact with a body of a user, the planar, non-padded vibrotactile material and rigid plastic housing cooperate to maximize sound vibrations produced by the electroacoustic transducer, thereby soothing the user.

19. The vibrotactile device of claim 18, further comprising a controller in communication with the at least one electroacoustic transducer, the controller configured for transmitting an at least one output signal to be produced by the at least one electroacoustic transducer.

20. The vibrotactile device of claim 19, further comprising at least one sensor for sensing external information and providing a signal to the controller in response to the external information, wherein the at least one output signal of the controller adjusts an operation of the soothing device in response to the external information.

21. The vibrotactile device of claim 19, wherein the controller is configured to adjust at least one of a power state, a volume, a run duration, a vibration intensity, or a vibration frequency of the at least one electroacoustic transducer.

22. The vibrotactile device of claim 19, wherein the controller is configured for receiving a user input to customize a vibration pattern generated by the at least one electroacoustic transducer.

23. The vibrotactile device of claim 18, wherein the planar, non-padded vibrotactile material comprises at least one of a microcellular elastomer, a polyurethane, a rubber, or a microcellular polyurethane.

24. The vibrotactile device of claim 18, wherein the padding cover is configured to have a shape of a cushion, a pad, a cat, a cuddle toy, or a vehicle.

25. The vibrotactile plush device of claim 18, wherein the planar, non-padded vibrotactile material has a thickness of approximately ⅛ of an inch.

26. A vibrotactile plush device comprising:

a padding cover:

a padding material defining a padding recess in a planar bottom surface of the padding material, the bottom surface of the padding material sized and configured for being placed in contact with a body of a user an interior surface of the padding cover;

a sound barrier material positioned within the padding recess:

a planar, non-padded vibrotactile material having a thickness of between about ⅛ of an inch and about ¼ of an inch and spanning an opening of the padding recess such that an exterior surface of the planar, non-padded vibrotactile material lies in the same plane as the bottom surface of the padding material and a bottom edge of the sound barrier material, the planar, non-padded vibrotactile material cooperating with the bottom surface of the padding material and a bottom edge of the sound barrier material to form a continuous planar surface for being placed in direct contact with the interior surface of the padding cover such that the padding cover is configured to encapsulate the padding material and the planar, non-padded vibrotactile material;

a rigid plastic housing positioned within the padding recess, a side wall of the housing in abutting contact with an opposing interior surface of the planar, non-padded vibrotactile material;

at least one electroacoustic transducer positioned within the housing and coupled to an interior surface of the side wall of the housing, such that the side wall of the housing is sandwiched between the at least one electroacoustic transducer and the planar, non-padded vibrotactile material, the at least one electroacoustic transducer configured for selectively emitting sound vibrations through each of the side wall of the housing and the non-padded vibrotactile material at frequencies that mimic a cat purr;

a cat-shaped padding cover configured for substantially encapsulating the padding material;

and at least one weight positioned within the padding material and configured for causing the device to have a weight that is similar to the weight of a cat;

wherein the sound barrier material is sandwiched between the padding material and the rigid plastic housing;

whereby, during use of the device, with the bottom surface of the padding material positioned so that the exterior surface of the planar, non-padded vibrotactile material is in direct contact with the interior surface of the padding cover, an exterior surface of the padding cover configured to be placed in direct contact with a body of a user, the planar, non-padded vibrotactile material and rigid plastic housing cooperate to maximize sound vibrations produced by the electroacoustic transducer, thereby soothing the user.

27. The vibrotactile plush device of claim 26, wherein the planar, non-padded vibrotactile material has a thickness of approximately ⅛ of an inch.

* * * * *